(12) United States Patent
Arnold

(10) Patent No.: US 9,996,184 B1
(45) Date of Patent: Jun. 12, 2018

(54) TOUCHSCREEN ACCESSORY AND SOFTWARE FOR MOTION-DISABLED USERS

(71) Applicant: Mark Gordon Arnold, Laramie, WY (US)

(72) Inventor: Mark Gordon Arnold, Laramie, WY (US)

( * ) Notice: Subject to any disclaimer, the term of this patent is extended or adjusted under 35 U.S.C. 154(b) by 0 days. days.

(21) Appl. No.: 14/708,572

(22) Filed: May 11, 2015

(51) Int. Cl.
*G06F 3/044* (2006.01)
*G06F 3/041* (2006.01)
*G06F 3/0354* (2013.01)
*G06F 3/046* (2006.01)

(52) U.S. Cl.
CPC ........ *G06F 3/0416* (2013.01); *G06F 3/03545* (2013.01); *G06F 3/044* (2013.01); *G06F 3/046* (2013.01); *G06F 2203/0331* (2013.01); *G06F 2203/04106* (2013.01); *G06F 2203/04108* (2013.01)

(58) Field of Classification Search
CPC .... G06F 3/0416; G06F 3/03545; G06F 3/044; G06F 3/046; G06F 2203/0331; G06F 2203/04106; G06F 2203/04108
See application file for complete search history.

(56) References Cited

U.S. PATENT DOCUMENTS

| 231,471 | A | 8/1880 | Boone |
| 256,824 | A | 4/1882 | Culter |
| 8,094,133 | B2 | 1/2012 | Sato |
| 8,125,469 | B2 | 2/2012 | Badeye |
| 8,528,117 | B2 | 9/2013 | Asiaghi |
| 8,564,553 | B2 | 11/2013 | Yew |
| 8,638,320 | B2 | 1/2014 | Harley |

(Continued)

FOREIGN PATENT DOCUMENTS

EP    2230589 A1 * 9/2010 ............. G06F 3/048

OTHER PUBLICATIONS

D.A. Bowman, "Novel uses of Pinch Gloves™ for virtual environment interaction techniques," Virtual Reality, vol. 6, No. 3, pp. 122-129, 2002.

(Continued)

*Primary Examiner* — Towfiq Elahi
(74) *Attorney, Agent, or Firm* — Antoinette M. Tease

(57) ABSTRACT

An accessory helps motion-disabled users operate a touchscreen device via an extra-software-layer running on the CPU of the device. The accessory may take the shape of a glove, stylus or thimble. The accessory has a circuit that selectively engages and disengages the electrical connection between the user and the touchscreen based on mode and/or user/transducer interaction to send extra information from the user to the extra-software layer. A controller in the accessory generates unique timing patterns of connection and disconnection which the extra-software layer reconstructs by computing statistics from motion-event timestamps. The extra-software layer uses one or more (x,y) coordinates to compute an (x',y') coordinate, which is shown on the pixel display. With (x',y') and the reconstructed-timing pattern in the extra-software layer, the user may separately 1) choose (x', y') non-destructively (leave unaltered the internal state of an underlying application) and 2) invoke an action associated with that (x',y').

4 Claims, 7 Drawing Sheets

(56) References Cited

U.S. PATENT DOCUMENTS

| | | |
|---|---|---|
| 8,648,837 B1 | 2/2014 | Tran |
| 8,803,844 B1 | 8/2014 | Green |
| 8,947,405 B2 | 2/2015 | Cho |
| 2011/0248946 A1* | 10/2011 | Michaelis ................ A61F 4/00 345/174 |
| 2011/0304577 A1* | 12/2011 | Brown ................ G06F 3/03545 345/174 |
| 2013/0106714 A1* | 5/2013 | Shahparnia ........... G06F 1/3203 345/173 |
| 2013/0127791 A1* | 5/2013 | Siuta ................... G06F 3/03545 345/179 |

OTHER PUBLICATIONS

J. Perng, et al., "Acceleration sensing glove (ASG)", The Third International Symposium on Wearable Computers (ISWC'99), pp. 178-180, 1999.

J.S. Zelek, et al., "A haptic glove as a tactile-vision sensory substitution for wayfinding". Journal of Visual Impairment and Blindness, vol. 97, No. 10, pp. 621-632, 2003.

R.W. Picard and J. Scheirer, "The galvactivator: A glove that senses and communicates skin conductivity", Proceedings 9th Int. Conf. on HCI, Aug. 2001.

T. Vu, et al."Distinguishing Users with Capacitive Touch Communication", 18th Int.Conf. Mobile Computing & Network, ACM, NY, doi: 10.1145/2348543.2348569, pp. 197-208, 2012.

J. Webster, Medical Instrumentation:Application and Design. John Wiley & Sons, Inc., pp. 197-199, 1998.

\* cited by examiner

TOUCHSCREEN ACCESSORY AND SOFTWARE FOR MOTION-DISABLED USERS

CROSS-REFERENCE TO RELATED APPLICATIONS

This application claims the benefit of provisional patent application 61/996,620, filed 2014 May 12 by the present inventor.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

BACKGROUND

Prior Art

The following is a tabulation of some of the prior art that appears relevant:

U.S. Patents

| Pat. No. | Kind Code | Issue Date | Patentee |
|---|---|---|---|
| 8,947,405 | B2 | 2015 Feb. 3 | Cho, et al. |
| 8,803,844 | B1 | 2014 Aug. 12 | Green, et al. |
| 8,648,837 | B2 | 2014 Feb. 11 | Tran, et al. |
| 8,564,553 | B2 | 2013 Nov. 22 | I-Hau Yew, et al. |
| 8,528,117 | B2 | 2013 Sep. 10 | Asiaghi |
| 8,125,469 | B2 | 2012 Feb. 28 | Badeye, et al. |
| 8,094,133 | B2 | 2010 Mar. 18 | Sato, et al., |

U.S. Patent Application Publications

| Pat. No. | Kind Code | Publ. Date | Applicant |
|---|---|---|---|
| 20140104224 | A1 | 2014 Apr. 17 | Ih, et al. |
| 20130268094 | A1 | 2013 Oct. 10 | Wiemeersch,et al. |
| 20130257804 | A1 | 2013 Oct. 3 | Vu, et al. |
| 20130234986 | A1 | 2013 Sep. 12 | Elias |
| 20130127791 | A1 | 2013 May 23 | Siuta |
| 20120242618 | A1 | 2012 Sep. 27 | Everest, et al. |
| 20110285671 | A1 | 2011 Nov. 24 | Wu, et al. |
| 20110234623 | A1 | 2011 Sep. 29 | Ure |
| 20100053113 | A1 | 2010 Mar. 4 | Wu, et al. |
| 20100053120 | A1 | 2010 Mar. 4 | Chang, et al. |
| 20090256824 | A1 | 2009 Oct. 15 | Hanizl, et al. |
| 20090211821 | A1 | 2009 Aug. 27 | Yy-Cho Yee |
| 20090167727 | A1 | 2009 Jul. 2 | Yi-Ching Liu,et al. |
| 20050231471 | A1 | 2005 Oct. 20 | Mallard, et al. |

Foreign Patent Documents

| Foreign Doc. Nr. | Cntry Code | Kind Code | Pub. Date | App. or Patentee |
|---|---|---|---|---|
| 2662754 | EP | A1 | 2013 Nov. 13 | Bespertov |
| 2012177573 | WO | A2 | 2012 Dec. 27 | Harley |

Nonpatent Literature Documents

D. A. Bowman, "Novel uses of Pinch Gloves® for virtual environment interaction techniques," *Virtual Reality*, vol. 6, no. 3, pp. 122-129, 2002 and http://www.fakespacelabs.com/tools.html www.virtex.com J. Perng, et al., "Acceleration sensing glove (ASG)", *The Third International Symposium on Wearable Computers* (*ISWC'99*), pp. 178-180, 1999

J. S. Zelek, et al., "A haptic glove as a tactile-vision sensory substitution for wayfinding". *Journal of Visual Impairment and Blindness*, Vol. 97, No. 10, pp. 621-632, 2003

J. Webster, J. *Medical Instrumentation:Application and Design*. John Wiley & Sons, Inc., 1998

R. W. Picard and J. Scheirer, "The galvactivator: A glove that senses and communicates skin conductivity", *Proceedings 9th Int. Conf. on HCI*, August 2001

"Accessibility added to Kindle Fire as blind group plans protest", http://www.mediaaccess.org. au/latest_news/general/accessibility-added-to-kindle-fire-as-blind-group-plans-protest.

http://www.wireless.att.com/learn/articles-resources/disability-resources/mobile-speak-magnifier.jsp http://www.parkinsons.org.uk/content/easycall-free-mobile-app-people-parkinsons.

C. Wacharamanotham, et al., "Evaluating swabbing: a touchscreen input method for elderly users with tremor", *SIGCHI Conference on Human Factors in Computing* (*CHI*11),pp. 623-626, 2011. H http://web.archive.org/web/20131018005240/http://www.n-trig.com/Data/Uploads/Misc/DuoSense %20Digitizer_February%202012.pdf http://web.archive.org/web/20121025064503/http://aiptek.eu/index.php/en/products/graphics-tablets-a-digital-pens/digital-pens/mynote-pen http://developer.android.com/guide/topics/ui/accessibility/index.html http://developer.android.com/tools/testing/testing_accessibility.html.

T. Vu, et al. ("Distinguishing Users with Capacitive Touch Communication", Proceedings of the 18th annual International Conference on Mobile Computing and Networking, ACM New York, N.Y., doi: 10.1145/2348543.2348569, pp. 197-208, 2012

H. W. Klein, "Noise Ammunity of Touchscreen Devices", Cypress Semiconductor Corp. Whitepaper, http://www.cypress.com/?docID=42410

Capacitive touchscreen devices are widely used in computing and communication. Unfortunately, they are not easily usable by a significant audience of elderly and motion-disabled users (individuals with disabilities that affect the control and stabilization of their arms and hands) who have difficulties operating such touchscreen devices. There are an estimated 34 million motion-disabled individuals in the US, many of whom can use an older mouse-based computer or button-based mobile phone but have trouble with newer touchscreen devices. The buttons in the older technology allows the motion-disabled user to choose an (x,y) position independently of invoking an action. A physical button is useful because 1) the motion-disabled user may need extra time to move to the intended position, and 2) the motion-disabled user hitting the physical button provides a separate information channel to invoke an action that the motion-disabled user can control. In an unadapted touchscreen device, motion-disabled users frequently invoke undesired actions because they lack the ability to make the required gesture that combines a two-dimensional position and an invocation into one fluid motion. A few inadvertent taps (mis-recognized by the operating system as a user invocation) can bring quite obscure screens that compound the problem.

One prior-art approach to solving this problem is a software-only approach that adapts the touchscreen device for motion disabled users. Unfortunately, there exists little such motion-disability software, other than those designed for the blind touch-speak-and-touch-again applications ("Accessibility added to Kindle Fire as blind group plans protest", http://www.mediaaccess.org.au/latest_news/general/accessibility-added-to-kindle-fire-as-blind-group-plans-protest.), or those that implement limited functionality (http://www.wireless.att.com/learn/articles-resources/disability-resources/mobile-speak-magnifier.jsp and http://www.parkinsons.org.uk/content/easycall-free-mobile-app-people-parkinsons). An alternative form of touchscreen input called "swabbing", which only relies on the average angular component of a motion-disabled user's motion, is believed to be useful for Parkinson's patients (C. Wacharamanotham, et al., "Evaluating swabbing: a touchscreen input method for elderly users with tremor", *SIGCHI Conference on Human Factors in Computing*(*CHI*11), pp. 623-626, 2011). However, swabbing is a more tedious, less direct way of interacting, and does not allow general-purpose access to full capabilities of the touchscreen.

A general software-only solution for the motion-disabled audience is very challenging. Despite the fact Google's Android operating system has an extensive internal framework to enable development of accessibility services (http://developer.android.com/guide/topics/ui/accessibility/index.html), they recommend the use of a hardware directional keypad (DPAD) consisting of up, down, left and right arrow buttons (http://developer.android.com/tools/testing/testing_accessibility.html). The DPAD was once an ubiquitous hardware feature on early-generation phones and tablets that is no longer commonly available as hardware manufacturers reduce cost by eliminating such physical buttons in favor of touch-only interfaces. Even a DPAD-equipped touchscreen poses problems for a motion-disabled user as the user may still inadvertently tap on the touchscreen. For this reason, in addition to accessibility software, motion-disabled users would benefit from a touchscreen accessory (which substitutes for the human finger) to help adapt the touchscreen device for motion-disabled users.

There are several prior-art touchscreen accessories designed to substitute for the human finger's role with touchscreen devices; however none of them are suitable to adapt touchscreen devices for motion-disabled users. For example, Wiemeersch, et al. (U.S. Application 20130268094) discloses a prosthetic accessory for users lacking digits with which to touch the touchscreen, but does not solve problem of inadvertent taps for those users with digits but who lack the neuromuscular control to form the required gestures and avoid inadvertent taps.

Many types of prior-art accessories are intended for non-disabled users. First, there are texting gloves and similar products, typified by Asiaghi (U.S. Pat. No. 8,528,117). Ordinary gloves insulate the connection between the user and the touchscreen, and thereby prevent the user from activating the touchscreen at all. Texting gloves are similar to ordinary gloves, except they have holes or conductive material at the fingertips, allowing the user to make an electrical connection to the touchscreen. Texting dots (http://www.amazon.com/Texting-Dots/dp/B0032GCP0C/) are adhesive conductors that attach to the finger to give the user more precise electrical contact. Other products allow users to convert ordinary gloves into texting gloves include a conducting resin (http://www.amazon.com/AnyGlove-TM-Synthetic-Touchscreen-Compatible/dp/B00AB3EVOW/) that users apply to ordinary gloves and a self-adhesive thin capacitor that attaches to the exterior of ordinary gloves (http://www.amazon.com/Capacitive-Sticker-Screen-iPhone-Smartphone/dp/B00AlVGQS8/).

Second, there are styli, which are typically conductive cases with tips that prevent damage to the surface of the touchscreen, typified by Badeye, et al. (U.S. Pat. No. 8,125,469) and Elias (U.S. Application 20130234986). Other form-factors, such as puppets or thimbles are known in the prior art, such as Green, et al. (U.S. Pat. No. 8,803,844), Everest, et al. (US 20120242618), Siuta (US 20130127791), Wu, et al. (U.S. Application 20110285671), Yy-Cho Yee (U.S. Application 20090211821) and Mallard, et al. (U.S. Application 20050231471). Such styli, gloves, etc. are similar in that they do not have any internal active electronic circuitry, only an electrical connection between the touchscreen and the user (making them quite inexpensive). For this reason, they do not eliminate problems caused by hand tremors and other problems experienced by motion-disabled users. Some styli have more sophisticated electromagnetic-, antenna-, and/or resonate-circuit components, as typified by Cho, et al. (U.S. Pat. No. 8,947,405), Sato, et al. (U.S. Pat. No. 8,094,133), Wu, et al. US 20100053113), Ih, et al. (U.S. Application 20140104224), Chang, et al. (U.S. Application 20100053120), Yi-Ching Liu, et al. (U.S. Application 20090167727), Chang An-Yu (U.S. Application 20100053120) and Bespertov (EP Application 2662754A1) that offer non-disabled users increased precision or convenience but that are not helpful to motion-disabled users.

Third, an authentication signet ring for touchscreen devices has been demonstrated by T. Vu, et al. ("Distinguishing Users with Capacitive Touch Communication", Proceedings of the 18th annual International Conference on Mobile Computing and Networking, ACM New York, N.Y., doi: 10.1145/2348543.2348569, pp. 197-208, 2012 and U.S. Application 20130257804) which capacitively injects a multi-hundred Hz signal having a relatively high voltage (10 to 20V) into the touchscreen circuit, which the circuit occasionally interprets as a sporadic phantom movement or touch event. Vu et al. propose training software in the touchscreen device to recognize the meaning of such sporadic phantom events and say practical usability (>85% reliability) of their idea may require modification of the proprietary firmware of the row-scanning touchscreen-interface circuit—a proposition that may be difficult to arrange. Due to its asynchronous nature, the phantom signal will cause phantom y coordinates to be received, which make Vu et al. problematic for an accessory whose purpose is to help the motion-disabled communicate substantially-accurate (x,y) information simultaneously with low-bandwidth information about invocation intention. Also, Vu et al. require a power supply with a much higher voltage than typical battery-powered accessories. Similar high-voltage techniques using metal "slugs" are used for testing touchscreen devices during manufacture (H. W. Klein, "Noise Ammunity of Touchscreen Devices", Cypress Semiconductor Corp. Whitepaper, http://www.cypress.com/?docID=42410) which share the same disadvantages in the context of motion-disabled users as Vu et al. Also, similar circuits disclosed by I-Hau Yew, et al. (U.S. Pat. No. 8,564,553) and Ure (U. S. Application 20110234623) use high voltages and are unsuitable for an accessory to assist motion-disabled users avoid inadvertent taps.

In contrast to such simple accessories, there are drawing pens (http://web.archive.org/web/20121025064503/http://aiptek.eu/index.php/en/products/graphics-tablets-a-digital-pens/digital-pens/mynote-pen and http://web.archive.org/web/20131018005240/http://www.n-trig.com/Data/

Uploads/Misc/DuoSense%20Digitizer_February%202012.pdf) which have on-pen electronics, including a wireless interface to a hardware receiver that plugs into the touchscreen. Because the pen is synchronized to the high-frequency updating of the screen, it can identify position accurately to the pixel (or sub-pixel) level, typically better than the capacitive touchscreen technology (which is actually disabled during the use of the pen). Such pens are an order of magnitude more expensive than gloves or styli, and are used only for special drawing applications.

Some prior-art styli for non-disabled users have circuitry to communicate extra data (such as stylus orientation, button activation, pressure and/or temperature sensing), including Tran et al., (U.S. Pat. No. 8,648,837), Hanizl, et al. (U.S. Application 20090256824) and Harley (WO Application 2012177573A2), however these assume they are used as an adjunct to finger invocation to communicate such extra data from the accessory operated by a non-disabled user (who is capable of avoiding inadvertent finger interference). They do not disclose how a touchscreen device could filter out inadvertent tap events caused by a motion-disabled user holding such an accessory who unintentionally touches the touchscreen nor do they disclose how to separate non-destructive communication of substantially-accurate (x,y) from the invocation of an action.

Prior-art glove-based interaction devices with active electronics bear some superficial similarity to such accessories, for example: conductive-fingertip gloves (D. A. Bowman, "Novel uses of Pinch Gloves™ for virtual environment interaction techniques," Virtual Reality, vol. 6, no. 3, pp. 122-129, 2002 and http://www.fakespacelabs.com/tools.html), "whole-gloves" with >2 conductors (www.virtex.com), accelerometer gloves (J. Perng, et al., "Acceleration sensing glove (ASG)", *The Third International Symposium on Wearable Computers (ISWC'99)*, pp. 178-180, 1999), tactile gloves (J. S. Zelek, et al., "A haptic glove as a tactile-vision sensory substitution for wayfinding". *Journal of Visual Impairment and Blindness*, Vol. 97, No. 10, pp. 621-632, 2003), muscle-tension gloves with inconvenient conductive gel (J. Webster, J. *Medical Instrumentation:Application and Design*. John Wiley & Sons, Inc., 1998) and skin-conductivity gloves (R. W. Picard and J. Scheirer, "The galvactivator: A glove that senses and communicates skin conductivity", *Proceedings 9th Int. Conf. on HCI*, August 2001). These glove-based interaction devices do not solve motion-disabled interaction issues with touchscreen devices, and may involve more costly hardware.

Advantages of the Present Invention

The present invention introduces a physical button as part of an inexpensive hardware accessory (a glove, stylus, thimble or mini-mouse) that substitutes for the human finger to reduce the chance of inadvertent invocation. In the preferred embodiment, a relatively simple, extra-software-layer running on the touchscreen provides visual feedback in a general-purpose way, allowing full access to the capabilities of the touchscreen. The extra-software layer intervenes between the novel accessory device and the unadapted behavior of the touchscreen device without getting in the way of that unadapted behavior. The novel touchscreen accessory has one or more buttons or similar transducer(s). From the user's standpoint, the novel accessory performs at least two separate functions: 1) allow the user to point to a substantially-accurate two-dimensional (x,y) location on the touchscreen non-destructively (meaning to leave unaltered the internal state of the underlying application) and 2) invoke an action associated with that (x,y) coordinate. Motion-disabled users may need to repeatedly adjust the position (x,y) they wish to touch on the screen to achieve the desired goal. The extra-software-layer on the touchscreen makes this (x,y) coordinate visible to the user, but conceals this information from the underlying application until the user pushes a button on the glove (or stylus or thimble or mini-mouse) to invoke an action associated with that coordinate. At that stage, the extra-software-layer emulates message(s) that the operating system would have generated if a non-disabled user were to form a valid gesture (e.g., tapping) associated with that coordinate.

DRAWINGS

Figures

Figure 5:
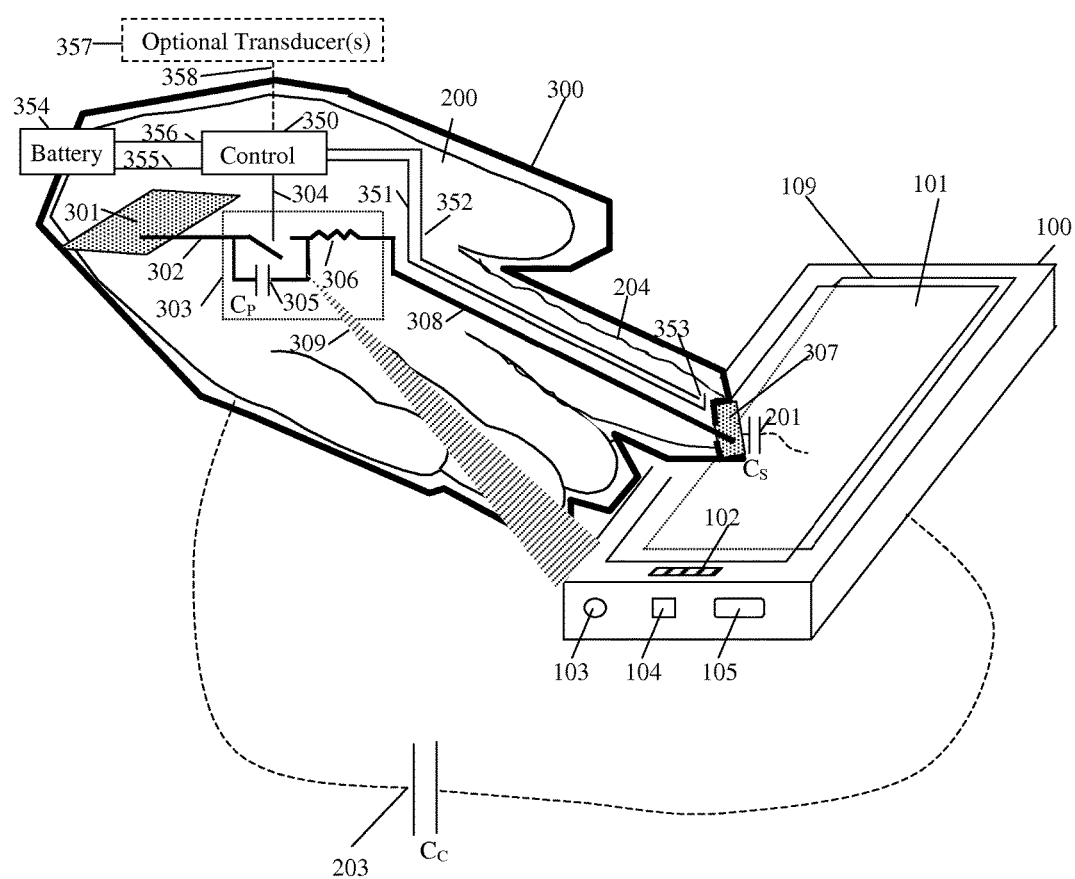

FIG. 5 shows a first embodiment of the novel hardware accessory implemented as part of an insulating glove that fits the user's hand and provides an intermittent electrical connection between the user's hand and the touchscreen, enabling the user to communicate two separate channels of information to the extra-software layer: substantially-accurate (x,y) coordinates and sensing from one or more button(s) or other transducer(s).

Figure 6:
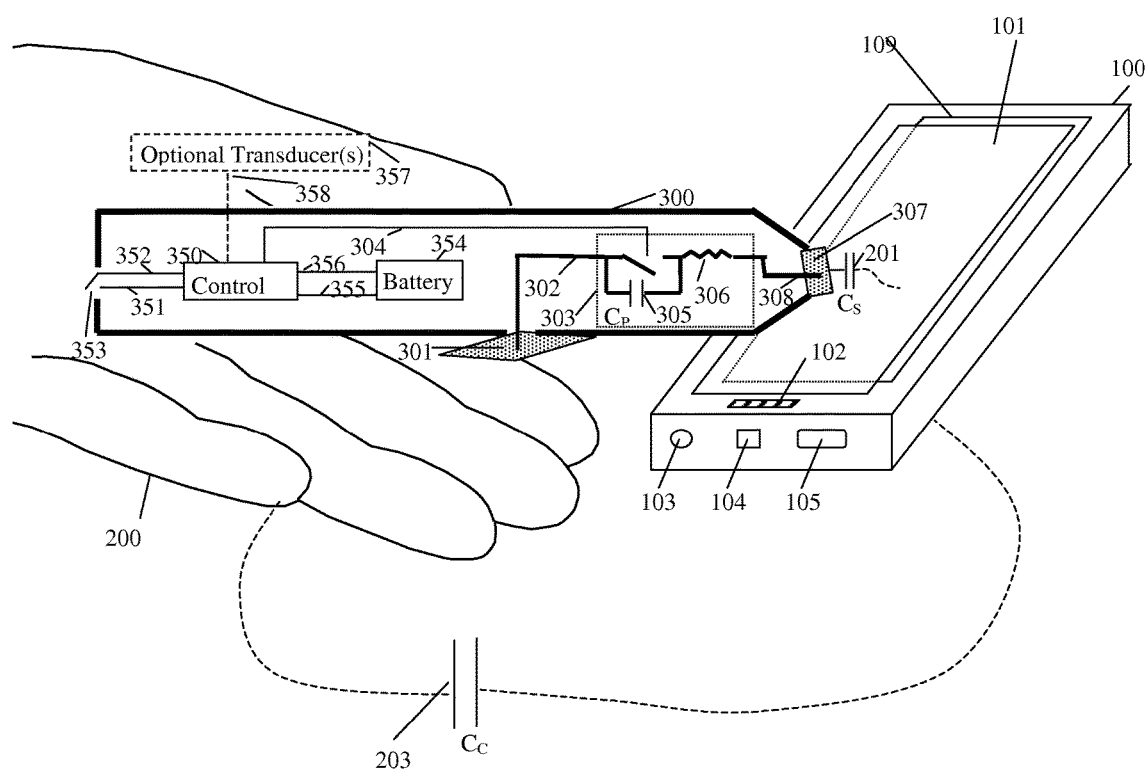

FIG. 6 shows an alternative embodiment of the novel accessory implemented as a stylus.

Figure 7:
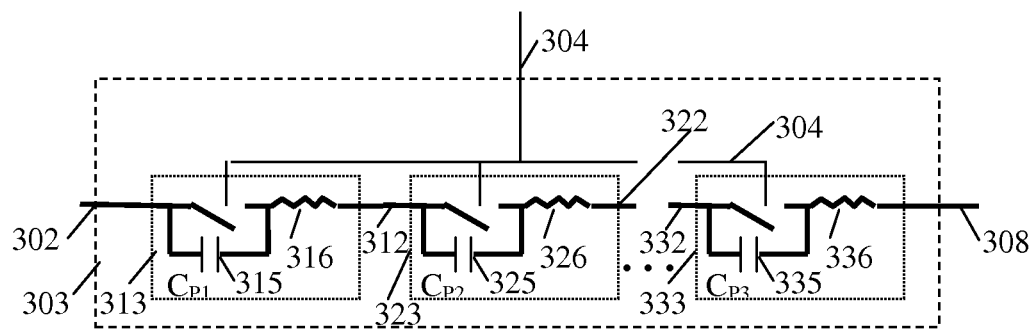

FIG. 7 shows how to arrange several inexpensive electrically-controlled switches in series to make a circuit that serves as a low-capacitance electrically-controlled switch.

DETAILED DESCRIPTION

Figure 1:
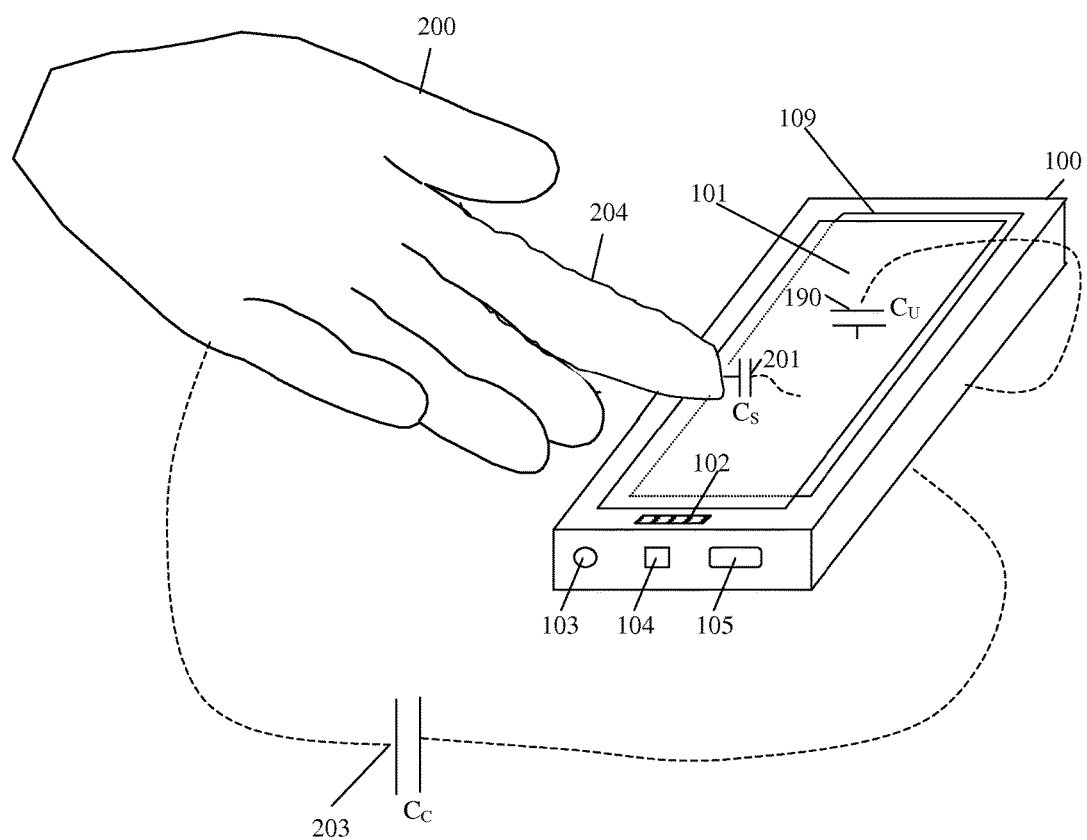
FIG. 1 shows the context in which the unaided human hand interacts capacitively with a prior-art touchscreen device.

Referring to FIG. 1, the prior-art capacitive touchscreen device 100 includes a touchscreen 101. The touchscreen 101 senses the change in capacitance that results when it is touched by a user's finger 204. Underneath the translucent material of touchscreen 101 is a pixel display 109, allowing an easy-to-understand user interface, in which the user touches the portion of touchscreen 101 at coordinate (x,y) co-located with the portion of an image displayed on pixel display 109. The (x,y) sensed by touchscreen 101 identifies an object displayed on touchscreen 109 of interest to the user. Typically, a prior-art touchscreen device 100 also includes several additional input-output interfaces, such as microphone 102, audio jack 103, wireless transceiver 104 and USB port 105.

The touchscreen 101 recognizes when it is touched by the user's hand 200 (usually by a single finger 204) because of the electrical circuit formed between the case of touchscreen device 100 through the finger-to-case capacitance 203 (typically with air as the dielectric and observed as $C_C$ picofarads), continuing through the finger-to-screen capacitance 201 (typically with glass or other similar material as the dielectric and observed as $C_S$ picofarads). Most regions of the touchscreen 101 are not connected through the user's hand in this fashion, and instead are connected through a simpler circuit formed between the case of touchscreen device 100 through the unconnected capacitance 190 (with air and glass as dielectrics observed as $C_U$ picofarads). Those skilled in the art will realize these capacitance values exist as ranges that vary depending on a variety of factors including the variability of the electric field near the human finger due to physiological factors and near the touchscreen device 100 due to environmental differences, as well as due to differences between different touchscreen devices. Those skilled in the art will realize touchscreen devices can function reliably despite the noise introduced by these factors because the magnitude of $C_U$ is significantly less than that or $C_C$ or $C_S$.

Figure 2:
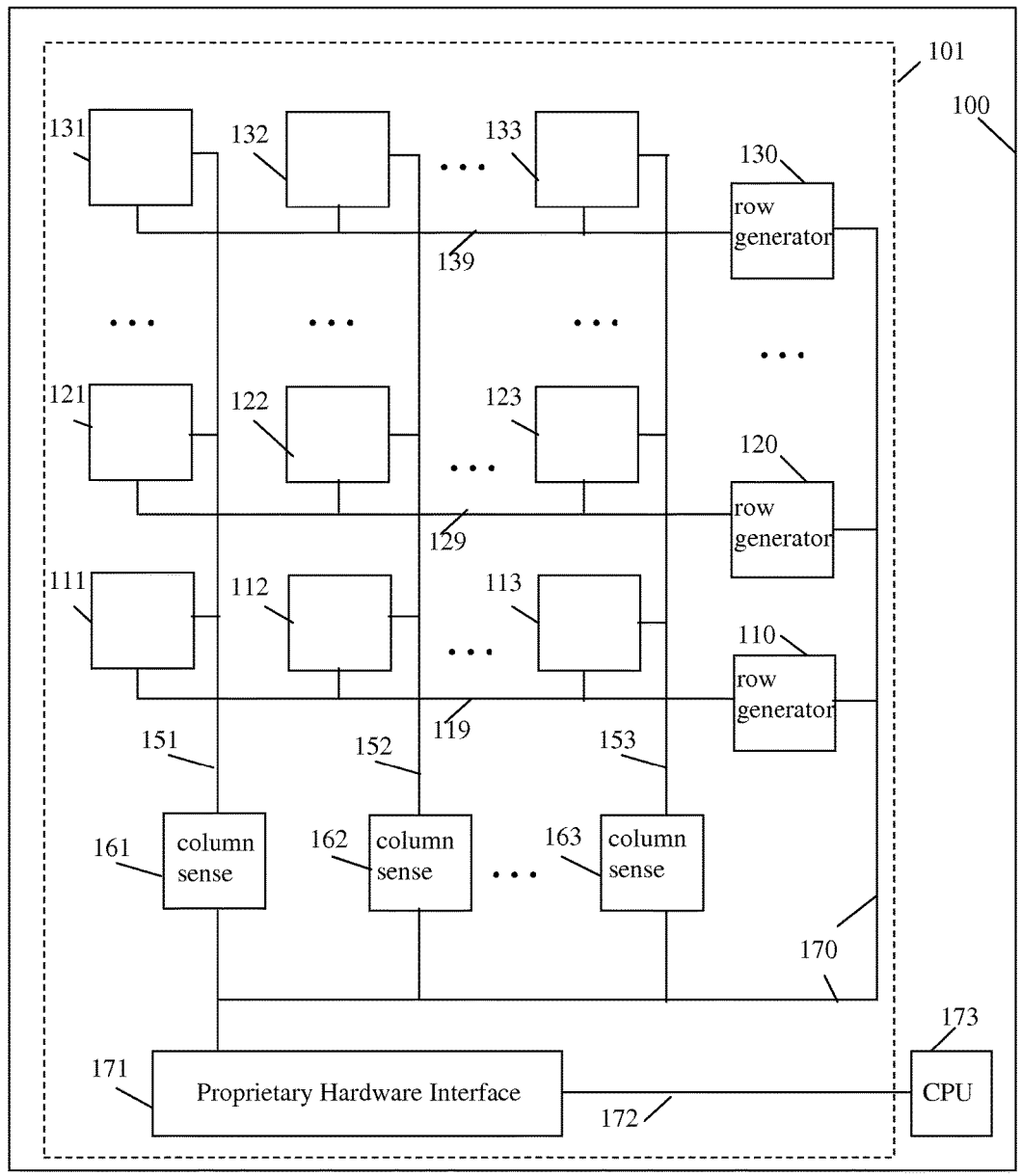
FIG. 2 shows a simplified view of the rectangular array of translucent capacitive plates and associated electronics composing a prior-art touchscreen together with the CPU that enables software to run on the touchscreen device.

Referring to FIGS. 1 and 2, the touchscreen 101 consists of a large two-dimensional array of individual capacitor plates (of which plates 111, 112, 113, 121, 122, 123, 131,132 and 133 are shown with ellipses in between to indicate many similar plates) embedded within the translucent dielectric material on the surface of touchscreen 101. The plates are connected to a plurality of voltage generators (of which generators 110, 120 and 130 are shown with ellipses to indicate many similar generators) corresponding to each row of the array via a plurality of row wires (of which wires 119, 129 and 139 are shown with ellipses to indicate many similar wires). The generators create a voltage spike relative to the case ground 100. The plates are also connected along the columns to a plurality of sensors (of which voltage sensors 161, 162 and 163 are shown with ellipses to indicate many similar sensors) via a plurality of column wires (of which wires 151, 152 and 153 are shown with ellipses to indicate many similar wires). The voltage generators 110, 120, 130, ... and sensors 161, 162, 163, ... cooperate to measure the capacitances of plates 111, 112, 113, 121, 122, 123, 131, 132, 133, ... in a time-multiplexed (row-by-row) fashion under the control of proprietary-hardware interface 171. Conceptually, this control is communicated via internal bus 170, although those skilled in the art can envision many alternative control arrangements. For example, the arrangement in FIG. 2 is capable of multi-touch, that is recognizing when more than one finger touches the screen. Those skilled in the art can envision a simpler arrangement only capable of recognizing one finger that time multiplexes rows and columns. The intelligence and functionality of the touchscreen device 100 (for instance, as a phone or a tablet computer) is implemented largely by a CPU 173, which connects to the proprietary hardware interface 171 (and therefore all the elements that function as touchscreen 101) via the CPU bus 172. Those skilled in the art will realize there are a wide variety of CPU bus architectures used in the prior art, and that the simple abstract connections shown in FIG. 2 are intended to represent any of these.

Figure 3:
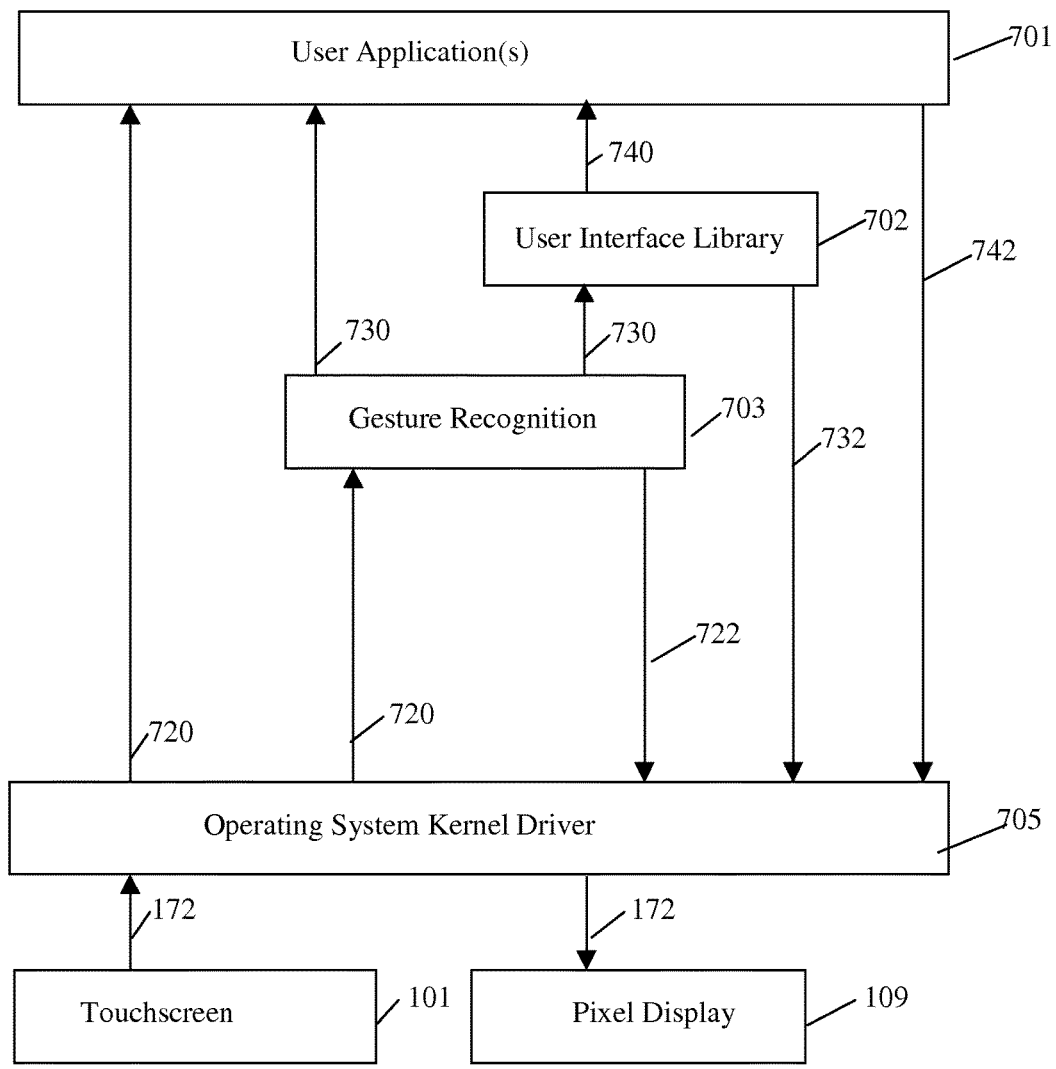
FIG. 3 shows conceptually the layers of software running in a prior-art touchscreen device relevant to the present invention, including operating system kernel driver, gesture recognition, user interface and user application(s).

The CPU 173 runs several levels of software for the touchscreen device 100. Referring to FIGS. 1, 2 and 3, the lowest level of software 705 (operating system, kernel and drivers) convert the large number of capacitance measurements provided by touchscreen 101 via bus 172 into a more compact and usable form for the upper levels of software, such as gesture recognition 703, user interface 702 and user application(s) 701. This operating system kernel driver level 705 and CPU bus 172 are also responsible to interface to all other devices, such as pixel display 109 that is activated by downward-flowing messages 722, 732 and 742. The software layer of the prior-art touchscreen device 100 of primary interest here is the operating system device driver software 705, which, among other things, compares the two-dimensional array of capacitance values measured by proprietary hardware interface 171 at an earlier time period (say ⅟60 of a second ago) against the two-dimensional array of capacitance values measured more recently. In regions of the arrays where the corresponding old and new capacitance values differ significantly, the operating system device driver software 705 categorize these regions as events to be communicated to higher levels of software. Many kinds of events may be included in a particular design; typically the most important of these are UP, DOWN and MOVE events associated with a particular (x,y) coordinate at a particular time, t. Messages 720 allow the operating system to communicate such events to higher levels of software. Instead of receiving thousands of capacitance values every ⅟60 of a second, the upper levels of software only receive event information when there are changes caused by external influence, such as the motion of the finger 204. Typically, the operating system has features like gesture recognition 703 that convert a sequence of UP, DOWN and MOVE events that follow prescribed patterns into gestures, like tapping, zooming and scrolling. The prescribed patterns must follow the time-varying parametric expectations of the operating system; in other words, the user is required to move according to a time-sensitive pattern in order for the gesture to be recognized by the operating system correctly. These gestures are communicated upwards via messages 730. It is primarily at this level of software where motion-disabled users have difficulties. Artifacts like hand tremor can cause sequences of unintended events, which gesture recognition 703 may misclassify. The operating system typically provides additional layers of software, such as user interface libraries 702 that modify the meaning of gesture messages 730 in context of different user interface elements, like check boxes and virtual buttons. Such context-sensitive user-interface information is communicated to the user application 701 via messages 740. For example, tapping on a checkbox changes whether it is checked or not, whereas tapping on a virtual button invokes the action associated with that button. For a motion-disabled user, inadvertent tapping when the (x,y) coordinate happens to be on a virtual button may cause inadvertent invocation of software that is hard or even impossible to undo. The goal of the present invention is to reduce the chance that a motion-disabled user experiences such difficulties. Those skilled in the art will recognize the layers of software in an actual operating system may differ from those outlined here, and this simple discussion is only to illustrate the general context of touchscreen software in which the present invention operates.

In the absence of finger 204 or similar object (such as a stylus), the measured capacitance at each (x,y) location is roughly constant ($C_U$). During such times, no events are signaled. When the user places the finger 204 at a particular $(x_1,y_1)$ location at time $t_1$, the measured capacitance at the associated plate changes from the default $C_U$ capacitance 190 to the effective capacitance, $C_E=1/(1/C_C+1/C_S)$, from the series capacitors 201 and 203. It is typical that $C_E$ is one or more orders of magnitude larger than $C_U$ in order for the touchscreen 101 to function. The operating system 705 recognizes this change from a region of the array entirely composed of $C_U$ measurements to a region centered on $(x_1,y_1)$ with one or more different capacitance measurements as a "DOWN $(x_1,y_1)$ at time $t_1$" event sent via message channel 720. Ideally, if the finger stays stationary, no additional events will be signaled. Realistically, the finger 204 will move as it continues to touch the surface 101 at time $t_2$. Such movement will cause the array of measured capacitances to change. The operating system 705 recognizes this change in which the center of the region of non-$C_U$ measurements has shifted to $(x_2,y_2)$ as a "MOVE $(x_2,y_2)$ at time $t_2$" event sent via message channel 720. Ultimately, the user removes the finger 204 at time $t_3$. The operating system 705 recognizes this change as an "UP $(x_3,y_3)$ at time $t_3$," event sent via message channel 720, with the likelihood that $(x_3,y_3)$ is the same as the last event's coordinate $(x_2,y_2)$. To make a very simple and more specific example of this, assume for one second from start of operation, nothing touches the touchscreen 101. Then the finger 204 touches the plate 111, which we will assume is associated with the coordinate (1,1). After an additional second, the finger 204 moves to plate 122, which we will assume is associated with the coordinate (2,2), without touching any other plates. After yet another second, the finger 204 is removed. The three events registered by the operating system 705 would be: "DOWN (1,1) at 1000 ms"; "MOVE (2,2) at 2000 ms"; and "UP (2,2) at 3000 ms". Those skilled in the art will recognize the unrealistic, idealized nature of this example, in which the finger only touches two plates, is representative of the more complex realistic situations in which multiple plates are involved and the operating system computes the center of mass of the region of plates involved.

Figure 4:
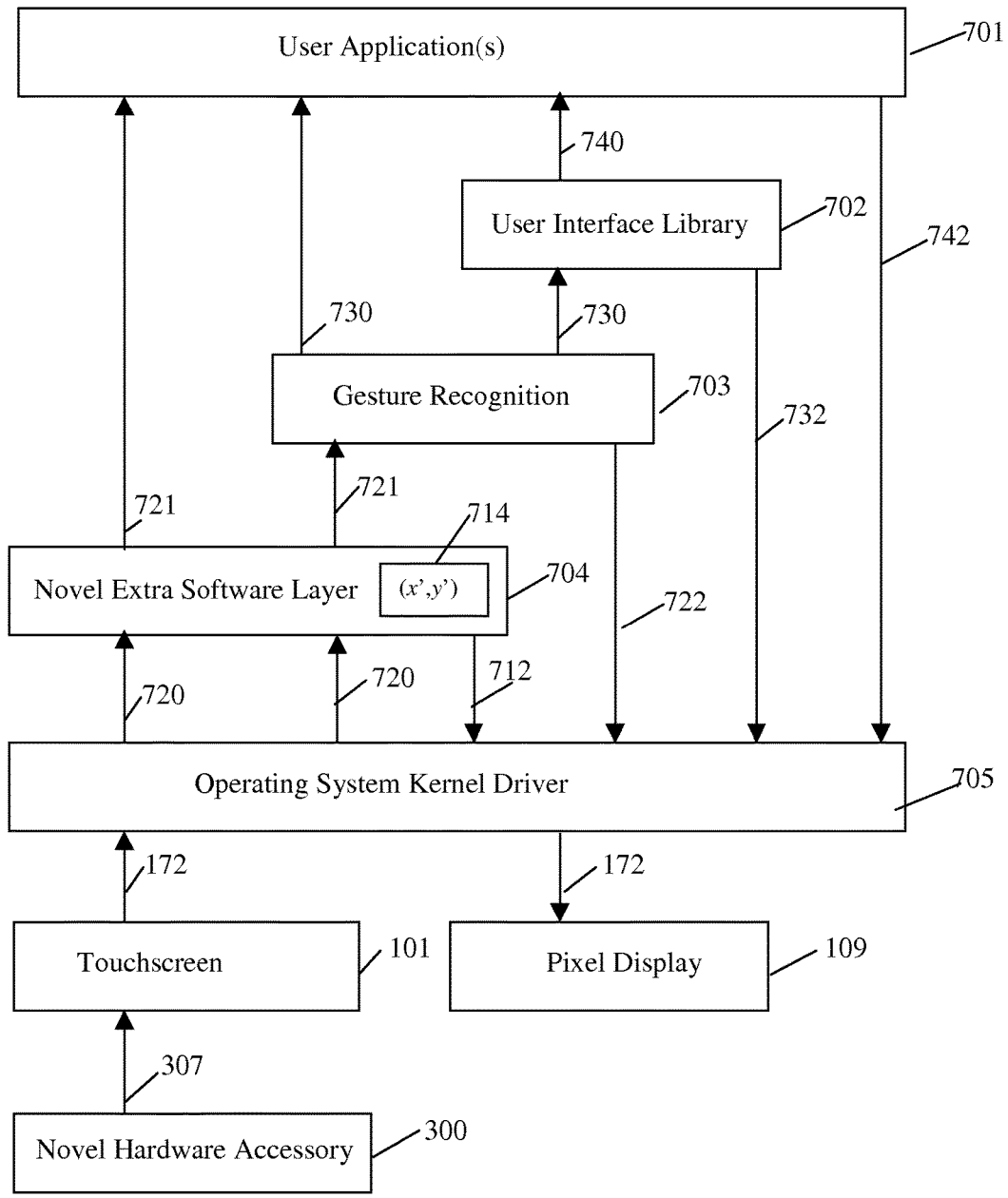
FIG. 4 shows how, without disturbing the higher layers of software, the novel extra-software layer running in the touchscreen device: intercepts messages created by the novel accessory, maintains an internal (x', y') coordinate, displays this coordinate on the pixel display, and uses this coordinate to send messages to higher layers when the user activates a novel hardware accessory.

Referring to FIG. 4, the present invention is an adapted touchscreen system for motion-disabled users which consists of a novel hardware accessory 300 that interacts with a novel extra-software layer 704. The novel accessory 300 encodes signals via connection 307 to touchscreen 101 and which in turn sends them to the operating system kernel driver 705 via bus 172. The extra-software layer 704 intercepts messages 720 coming from the operating system kernel driver 705 and recognizes the signals encoded by the hardware accessory 300. The extra-software layer 704 includes (x', y') coordinate memory 714 for storing the intended position on touchscreen 101 that the motion-disabled user intends to manipulate. The extra-software layer 704 sends messages 712 to the operating system kernel driver 705, which in turn sends a visual indicator of (x',y') from coordinate memory 714 to pixel display 109 via bus 172, thereby giving the user visual feedback. When the user is satisfied with (x',y'), the user causes accessory 300 to encode a special signal, which in turn cause the extra-software layer 704 to substitute transformed events 721 involving coordinate memory 714 that are passed upwards to higher software layers, which allow the motion-disabled user to utilize the higher layers of the software more successfully than in an unadapted touchscreen system.

The novel hardware accessory 300 may be implemented in a variety of form factors, such as a glove, a stylus, thimble or mini-mouse. Referring to FIG. 5, the novel accessory 300 is implemented as a glove which fits around the user's hand 200. The insulating material used to make the glove accessory 300 has a sufficient dielectric constant to make capacitive interaction between the hand 200 and the touchscreen 101 negligible; in other words, in the absence of the other novel components of the present invention, the glove material will exhibit the typical complaint users express about not being able to use touchscreen devices whilst using gloves.

In order to allow intermittent electrical connection of the user's hand 200 to the touchscreen 101, a conductive surface 301 is provided inside the interior of glove 300. Those skilled in the art will recognize many materials could be used to provide this conductive surface, such as conductive cloth, metal foil, etc. The size, shape and placement of the conductive surface 301 should maximize the coupling to the hand 200, minimize coupling to the touchscreen 101, and be unobtrusive to the user. For example, the back of the hand represents a good compromise of these traits. Those skilled in the art will recognize many other possible sizes, shapes and placements for the conductive surface 301. Conductive surface 301 is connected to an electrically-controlled switch 303 via wire 302. Wire 302 and electrically-controlled switch 303 should be placed to avoid excessive coupling with touchscreen 101, such as on top of the finger 204. Electrically-controlled switch 303 is connected via bus 304 to control circuit 350. Those skilled in the art will recognize control circuit 350 may be implemented in a variety of ways, such as digital logic and/or microprocessor circuits. Control circuit 350 is powered by battery 354 via wires 355 and 356. Those skilled in the art will realize there are many types of electrically-controlled switching devices that are available to use in the present invention. Some examples include: 1) non-latching electromechanical relays that are activated by the presence of a current and deactivated by the absence of current, in which case bus 304 consists of two wires providing such current; 2) latching electromechanical relays that are activated and deactivated by short current pulses of opposite direction, in which case bus 304 consists of two or three wires arranged to deliver such current pulses; 3) semiconductor bilateral switches that are constructed from Field Effect Transistors (FETs) powered by a supply voltage and controlled by a control voltage, both voltages relative to ground, in which case bus 304 consists of three wires that provide the supply, control and ground; and 4) optoisolators that communicate internally via a Light Emitting Diode (LED), in which case bus 304 operates the LED and thereby the switch. Electromechanical relays typically make an inherent clicking sound, which can act as a sonic indicator 309 of the switching activity, whereas semiconductor switches operate silently. All electrically-controlled switches have some inherent parasitic capacitance 305 parallel to the switch (measured as $C_P$ picofarads when the switch is open) and parasitic resistance 306 in series to the switch (measured as $R_P$ Ohms when the switch is closed). It is desirable to choose electrically-controlled switch 303 so as to minimize $C_P$ primarily and to minimize $R_P$ secondarily. This is because a small amount of resistance (on the order of less than 100 Ohms) usually does not interfere with the operation of the invention, whereas the operation is very sensitive to capacitance. The electrically-controlled switch 303 is connected via wire 308 to conductive tip 307 which is coupled to touchscreen 101 via $C_S$ capacitance 201. In turn, touchscreen 101 is coupled back to the hand 200 via $C_C$ capacitance 203, similar to the situation when the novel accessory is not employed. When electrically-controlled switch 303 is closed and tip 307 is touching the touchscreen 101, the effective capacitance between hand 200 and touchscreen 101 is $C_E=1/(1/C_C+1/C_S)$, again similar to the situation when the novel accessory 300 is not employed and finger 204 touches the touchscreen 101 directly. When electrically-controlled switch 303 is open and tip 307 is touching the touchscreen 101, the capacitance between hand 200 and touchscreen 101 is $C_O=1/(1/C_E+1/C_P)$ which is distinct from the capacitance, $C_U$ (when the novel accessory 300 is not employed and finger 204 does not touch the touchscreen 101). In order for the open state of the electrically-controlled switch 303 when tip 307 touches the touchscreen 101 to be perceived by touchscreen 101 as the same as the unaided finger 204 not touching the touchscreen 101, the electrically-controlled switch 303 must have $C_P$ capacitance 305 significantly less than $C_E$, so that $C_O$ is approximately the same as $C_P$. Choosing $C_P$ the same as or larger than $C_E$ would make $C_O > C_E/2$, in which case it is unlikely touchscreen 101 would register the change between $C_E$ and $C_O$ as UP and DOWN events. Depending on the sensitivity of touchscreen 101, it may be necessary to make $C_P$ as small as $C_U$.

On the exterior surface of glove 300, tip 307 is positioned near the point where glove 300 covers the tip of finger 204. Relatedly, on the interior surface of glove 300, a push button 353 is positioned near the point where the glove 300 covers the tip of finger 204. The push button 353 is connected to control circuit 350 via wires 351 and 352. The user's finger 204 may rest on the physically-attached combination of push button 353, glove 300 and tip 307 without activating the push button 353. It is desirable that the force required to activate the push button 353 be sufficient that the motion-disabled user can move the finger 204 along the touchscreen 101 while holding the tip 307 directly on the surface of touchscreen 101 without activating the push button 353 yet also let the motion-disabled user be able to activate the push button 353 volitionally and perceive the tactile and/or haptic distinction between the activated and deactivated states of push button 353. Those skilled in the art will recognize there are a wide variety of push buttons available that satisfy these requirements.

Referring to FIGS. 4 and 5, when novel accessory 300 touches the touchscreen 101 but the user has not activated the push button 353, the control circuit 350 senses the deactivated state of the push button 353 via wires 351 and 352, and in response generates a sequence of commands via bus 304 to open and close electrically-controlled switch 303 in a first predefined timing pattern. When novel accessory 300 touches the touchscreen 101 and the user has activated the push button 353, the control circuit 350 senses the activated state of the push button 353 via wires 351 and 352, and in response generates a sequence of commands via bus 304 to open and close electrically-controlled switch 303 in an alternative predefined timing pattern. These patterns of $C_O$ and $C_E$ capacitances are measured by touchscreen 101 and received by the operating system kernel driver software 705 via the coupling of touchscreen 101, capacitance 201, tip 307, capacitance 203 and wire 308. The operating system kernel driver software 705 perceives the opening and closing of electrically-controlled switch 303 as UP and DOWN events, respectively, with timing patterns that roughly match the predefined timing patterns of control circuit 350. The operating system kernel driver software 705 communicates via messages 720 such timed patterns of DOWN and UP events to extra-software layer 704. Using the messages 720 about the DOWN and UP events caused by accessory 300, the extra-software layer can determine both the approximate (x,y) where the user has placed the tip 307 on touchscreen 101 and also whether the user has activated the push button 353. When push button 353 is deactivated, the extra-software layer 704 does not pass messages 720 upwards to higher software layers 703, 702 and 701. Instead, the extra software layer 704 uses one or more of the (x,y) coordinate(s) from messages 720 to calculate an internal coordinate (x',y') stored in memory 714, which extra software layer 704 uses to provide visual feedback to the user on pixel display 109 (via message 712, driver 705 and bus 172) without changing the state of higher software layers 703, 702 and 701. When push button 353 is activated, the extra-software layer 704 substitutes transformed events 721 including internal coordinate (x',y') from memory 714 to be passed upwards to higher software layers 703, 702 and 701, thereby allowing the motion-disabled user to invoke the higher layers of the software by activating push button 353. Because the motion-disabled user has visual feedback on pixel display 109 of the internal coordinate (x',y') stored in memory 714 and the user has volitional control over activation of the push button 353, this embodiment allows the motion-disabled user to operate the higher layers of software 703, 702 and 701 more successfully than in the unadapted touchscreen system.

Optionally, control circuit 350 may be connected via bus 358 to additional user-interface transducer(s) 357. Those skilled in the art will recognize many types of user-interface transducer(s) are possible, such as push buttons of the same kind as push button 353, or additional instances similar to the novel circuit (composed of wire 302 (somehow connected to hand 200), electrically-controlled switch 303, wire 308 and tip 307) located on a different digit but where control circuit 350 may issue a distinct timing pattern other than the one on bus 304. Alternatively, optional transducer(s) 357 may include one or more of: multi-position switches, regions of conductive cloth, potentiometers, hall effect switches, phototransistors, LEDs, LCDs, etc. These transducer(s) may be placed on the tips of other fingers or thumb on glove 300 (allowing single-handed activation) or on top of hand, fingers, or thumb of glove 300 (allowing operation by the other hand and/or visual inspection of state and/or a two-glove system that synchronize mode when appropriate parts of the left and right touch each other). Such transducer(s) may be intended to be used when tip 307 is touching touchscreen 101, or be intended to be used when tip 307 is not touching touchscreen 101, or both (possibly having distinct meanings when touching the touchscreen 101 and when not touching the touchscreen 101). For example, conductive cloth on the thumb and a finger other than 204 could be used when finger 204 is not touching touchscreen 101 to allow the user to change the internal mode of the control circuit 350. Providing internal modes for control circuit 350 would allow for more than two distinct timing patterns to be communicated to the extra-software layer 704, in turn allowing the extra-software layer 704 to request various gestures (such as scrolling or zooming) from gesture recognition 703 without requiring the motion disabled user to perform the difficult motions required to create those gestures manually. Such modes could be displayed to the user via LEDs or LCDs. Alternatively, instead of an internal mode in control circuit 350 controlled by push buttons or conductive cloth, the transducer 357 could be a multi-position switch placed on top of the hand (operated by the user's other hand and providing visual feedback to the user) to select among more than two distinct timing patterns to be communicated to the extra-software layer 704. Those skilled in the art can imagine many similar arrangements of transducer(s) 357 that allow the user to communicate more than two distinct timing patterns to the extra-software layer 704 in order to make features of gesture recognition 703 available to motion-disabled users.

Referring to FIGS. 4 and 5, when touchscreen device 100 provides microphone 102 and electrically-controlled switch 303 is selected to be an electromechanical relay that generates a sonic indicator 309, it is possible to provide fault tolerance in the operation of a variant of the present invention. In such a fault-tolerant variant of the present invention, the hardware shown remains the same. In the event the coupling of touchscreen 101, capacitance 201, tip 307, capacitance 203, wire 308 and operating system kernel driver 705 fails to send the required predefined sequences of UP and DOWN events to extra-software layer 704, a set of failsafe routines may be provided within extra-software layer 704 to receive the sonic indicator 309 via microphone 102 and recognize sonic timing patterns within sonic indicator 309 and use these timing patterns in lieu of the expected UP and DOWN timing patterns. Those skilled in the art will recognize other features of touchscreen devices, such as audio jack 103, wireless transceiver 104 and USB port 105 may additionally and/or alternatively provide failsafe mechanisms; however, these other features would add to the cost of the hardware. Extra software layer 704 may additionally provide routines that transmit failure information via wireless transceiver 104 and/or USB port 105 to a central location for analyzing such failures.

Alternative embodiments may use other form factors, such as a stylus, a thimble or a mini-mouse. Referring to FIG. 6 the novel accessory 300 is implemented as a stylus which is held by the user's hand 200. Insulating material, such as plastic, is used to make the case of the accessory 300. The user's hand 200 connects via a conductive surface 301 on the exterior of accessory 300. Conductive surface 301 is connected to an electrically-controlled switch 303 via wire 302. Electrically-controlled switch 303 is connected via bus 304 to control circuit 350. Control circuit 350 is powered by battery 354 via wires 355 and 356. Tip 307 is on the exterior surface of one end of accessory 300. Tip 307 is electrically connected to electrically-controlled switch 303 via wire 308. At or near the other end of accessory 300, a push button 353 is positioned where it is convenient for the user to activate it. The push button 353 is connected to control circuit 350 via wires 351 and 352. The user can hold the accessory 300 with tip 307 on touchscreen 101 without activating the push button 353. The user manipulates push button 353 to select between two distinct timing patterns that are communicated to extra-software layer 705 via tip 307. Optionally, control circuit 350 may be connected via bus 358 to additional user-interface transducer(s) 357 to select among more than two distinct timing patterns to be communicated to extra-software layer 704 via tip 307. Those skilled in the art will realize that other form factors, such as thimble or mini-mouse, can achieve substantially the same effect using similar elements.

Referring to FIG. 7, it is essential to the operation of all embodiments of the present invention that the electrically-controlled switch 303 has the lowest possible parasitic capacitance, $C_P$. One way to lower the capacitance of inexpensive switches is to use two or more electrically-controlled switches 313, 323, . . . , 333 in series that are all controlled by the same wire 304 to form a circuit 303 that functions as a low-capacitance electrically-controlled switch 303 to be used as shown earlier. The left terminal of electrically-controlled switch 313 is wire 302 (used elsewhere in the present invention somehow connected to the user's hand). The right terminal of electrically-controlled switch 313 is connected to the left terminal of electrically-controlled switch 323 via wire 312. The ellipsis indicates a series of zero or more similar connections of electrically-controlled switch(es) between wires 322 and 332. The left terminal of electrically-controlled switch 333 is wire 332. The right terminal of electrically-controlled switch 333 is wire 308 (used elsewhere in the present invention somehow connected to the tip). The electrically-controlled switches 313, 323, . . . , 333 have parasitic capacitances 315, 325, . . . , 335 (denoted $C_{P1}$, $C_{P2}$, . . . , $C_{P3}$) and parasitic resistances 316, 326, . . . , 336 (denoted $R_{P1}$, $R_{P2}$, . . . , $R_{P3}$). The effective parasitic capacitance, $C_P=1/(1/C_{P1}+1/C_{P2}, +1/C_{P3})$, will be lower at the cost of increased effective resistance, $R_P=R_{P1}+R_{P2}, +R_{P3}$. For example, if $C_{P1}=C_{P2}=\ldots=C_{P3}$ and $R_{P1}=R_{P2}=\ldots=R_{P3}$, placing n switches in series will theoretically lower the capacitance by a factor of n at the cost of increasing the resistance by a factor of n. Cross coupling of the switches will limit the effectiveness of this to less than theoretically possible, but even so, given that the invention tolerates $R_P$ as high as one-hundred or so Ohms, the series arrangement allows a several-fold reduction in $C_P$ using inexpensive (typically semiconductor) switches. Such switches each may have resistances around ten to twenty Ohms, (as is typical of common devices like the 4066 quad bilateral switch integrated circuit) limiting the practical n to four or six.

Although the novel hardware accessory and extra-software layer are described as aiding motion-disabled users, other uses of this novel capacitive touchscreen approach are possible. For example, referring to FIGS. 4 and 6, with appropriate extra-software layer 704, the button 353 on stylus 300 could be used to allow a user to select among several different colors for a drawing application. As another example, several different accessories, which differ from each other only in the predefined timing sequence produced by control circuit 350, could allow a user to use different colors by choosing different styli, without necessarily the need for any button or transducer. Also, such a set of accessories with different timing sequences could be used in multi-player games, where the extra software layer 704 functions to identify which piece is placed where on the touchscreen.

Yet another use for a set of accessories with different timing sequences would be to distribute one accessory to each authorized user of a single touchscreen 101, and have the extra-software layer 704 authenticate and log in the particular user. In addition to this simple authentication (of the limited kind proposed using the different, inferior, high-voltage-based technology by Vu et al.), the extra-software layer 704 and the particular user's hardware accessory 300 (now including button 353 and/or transducer(s) 357) could return to the standard timing patterns in the first embodiment useful for motion disabled users after issuing the authentication sequence. This would allow an expensive touchscreen device to be easily shared by multiple disabled users in a group setting, like a nursing home, without requiring the motion-disabled users to go through the tedious process of logging on. Care givers may be dubious about purchasing each motion disabled user an individual touchscreen device when the acceptance of the device by the particular user is uncertain. Since purchasing multiple accessories will be less expensive, this use of the present invention removes some of the cost barrier to greater touchscreen use among such populations. Also, identifying each individual user would allow the extra-software layer 704 to customize its adaptive behavior to the particular motion-disability problems of that user. In order to reduce manufacturing costs by offering only a single standard hardware accessory 300, control circuit 350 could include non-volatile memory (such as flash which is commonly available when control circuit 350 is implemented in a single-chip microcontroller) and a programming mode allowing care givers (rather than the manufacturer) to download specific parameters to each individual's accessory. Those skilled in the art will recognize many approaches for downloading into non-volatile memory. One possible novel method would be to have a specially outfitted control circuit 350 which is sensitive to how long it has been powered, with the advantage of needing no additional hardware beyond that shown in FIG. 6. The care giver briefly replaces the battery 354 with power supply from a programmer circuit. The programmer provides brief intervals of power encoding the parameters to be downloaded between interludes of no power. The powered-up programming intervals would be shorter than possible by manual insertion and removal of the battery 354. The control circuit 350 recognizes after the passage of this short programming interval from power up, no changes to parameters will occur as long as battery 354 remains connected. Three distinct short powered-up interval durations would allow control circuit 350 to: 1) bulk erase the contents of non-volatile parameter memory; 2) write a '0' in the next sequential bit of the non-volatile parameter memory; and 3) write a '1' in the next sequential bit of the non-volatile parameter memory. Some of the non-volatile memory in such a design would be reserved for an index into the remaining part of the non-volatile memory, which hold the user's parameters.

Those skilled in the art will recognize the use of an electromechanical relay for electrically-controlled switch 303 will reduce battery life. An optional approach to minimize this difficulty with any of the embodiments described previously would be to cause control circuit 350 to enter a low-power ("sleep") mode (stopping the clicking of the relay) after inactivity of push button 353 for a significant period of time (say several seconds or minutes). For certain embodiments, this low-power mode may make the accessory 300 inoperable until the user awakens the accessory 300 by pushing the push button 353 the first time. For embodiments using a latching relay for electrically-controlled switch 303, it would instead be possible for control circuit 350 to park the latching relay 303 in the closed position before going into low-power mode, allowing the sleeping accessory 300 to act like a stylus until the user hits push button 353, thereby awakening accessory 300 to normal operation. In embodiments that allow multiple users, each with a unique accessory, to be authenticated by a single touchscreen device, the awakening process for each accessory could include the authentication code for that particular user before entering normal operation.

Those skilled in the art will realize the extra-software layer of present invention can be implemented in a variety of ways on different operating systems, and the associated detailed software code is too extensive to discuss here. As a simple, tiny example of how such coding could be done to recognize reliably the timing patterns created by accessory 300, Appendix 1 gives a standalone application for the Android Operating System in Java (rather than a complete extra-software layer 704 that integrates with the operating system). This tiny application lets the user move a green circle (with a small red square at its center) around the touchscreen with the accessory 300. When the user pushes button 353, the circle changes to red (with a green square at its center), and the application pops up a "toast" message briefly showing the (x', y') coordinate. The "toast" in this tiny example simulates sending of upward message 721 in an actual embodiment of the extra-software layer 704. This tiny example application assumes control circuit 350 makes a timing pattern of 10 Hz (50 ms UP and 50 ms DOWN) when the button 353 is pushed and of 5 Hz (100 ms UP and 100 ms DOWN) when the button 353 is not pushed. The application uses arrays to store timing data from the last numSample UP and DOWN events, and computes averages and standard deviations. The button is recognized as being pushed (via the activeArnoldware variable) when the mean UP and DOWN times are less than 70 ms and the standard deviations are suitably small. With such a statistical decision, it is unlikely the extra-software layer could ever activate the activeArnoldware variable in a situation where a motion-disabled user who has not pushed the button inadvertently touches the screen. Those skilled in the art will realize this is just an illustrative example and different numeric parameters may be optimal in different contexts, and many other techniques, including various coding and error-correcting approaches, could be used instead to make various embodiments of the present invention reliable and compatible with various operating systems. For example, different operating systems communicate a variety of messages relating to touch events in a more complex manner than this simple illustration, and the extra-software layer can treat these appropriately with the goal of recognizing the distinct timing patterns generated by the control circuit 350.

Those skilled in the art will recognize control circuit 350 may be implemented by a microprocessor or microcontroller, such as the TI MSP430. Appendix 2 gives C code for the TI MSP430 using the Energia development system (similar code would work with the Arduino microcontroller and development system) that implements a 10 Hz/5 Hz timing pattern using a latching relay.

CONCLUSION, RAMIFICATIONS, AND SCOPE

Accordingly, the reader will see that, according to one embodiment of the inventions, I have provided an accessory (300) including a conductive surface (301), a switch means (303), a conductive tip (307), a controller means (350) and a transducer means (353, 357) that communicates between a motion-disabled user and an extra-software-layer (704) via a touchscreen by selectively engaging and disengaging the electrical connection between the user and the touchscreen according to unique timing patterns based on user/transducer interaction. Simultaneously, the touchscreen recognizes (x,y) coordinates, allowing the extra-software-layer to compute an (x',y') coordinate (714) shown on the pixel display (109), allowing the user separately to 1) choose (x', y') non-destructively and 2) invoke an action associated with that (x',y'). The extra-software layer will not invoke an action if the user inadvertently touches the screen when the accessory is acting non-destructively.

While the above description contains many specificities, these should not be construed as limitations on the scope of any embodiment, but as exemplifications of various embodiments thereof. Many other ramifications and variations are possible within the teachings of the various embodiments. For example, the accessory may be fabricated as an insulating glove where the conductive surface is conductive cloth in the interior of the glove and the conductive tip on a finger also incorporates a transducer. Alternatively, the accessory may be fabricated as plastic stylus case with the conductive surface on the outside opposite of the conductive tip, and the transducer(s) are button(s) accessible to the user. The switch means may be an electromechanical relay, a bilateral semiconductor switch, or equivalent circuits that lower parasitic capacitance. Because the proposed approach provides a more reliable information channel (even in the presence of inadvertent taps) compared to prior-art techniques, the extra-software-layer may successfully reconstruct the timing pattern generated by the accessory by simple statistics (such as mean, standard deviation or variance) without the need for machine learning, although those skilled in the art might choose more sophisticated statistical, signal-processing, coding and/or machine-learning techniques to reconstruct the timing pattern.

Thus, the scope should be determined by the appended claims and their legal equivalents, and not by the examples given.

Appendix 1: Tiny Example Android Application

```
package com.arnoldware.markdraw2;
import android.os.Bundle;
import android.view.MotionEvent;
import android.view.View;
import android.content.Context;
import android.graphics.Canvas;
import android.graphics.Paint;
import android.util.DisplayMetrics;
import android.app.Activity;
import android.view.Menu;
import android.widget.Toast;

//copyright 2014 Arnoldware Applications, LLC All Rights Reserved public class MainActivity extends Activity
{   long oldtime=0,uptime=0,downtime=0;
    long[] hu = {0,0,0,0,0,0};
    long[] hd = {0,0,0,0,0,0};

int iu=0,id=0;
    long othertime;
    int numSample=6;
    MyView myview;
    DisplayMetrics metrics = new DisplayMetrics();
    float x=20,y=20,oldx=20,oldy=20;
    boolean activeArnoldware = false;
    boolean oldActiveArnoldware = false;
    String touchStr="";

class MyView extends View{
         Paint paintGreen = new Paint();
         Paint paintRed = new Paint();
         Paint paintText = new Paint();
         MyView(Context context)
           {super(context);
            paintText.setColor(0xff0000ff);
            paintText.setTextSize(20);
            paintRed.setColor(0x22ff0000);
            paintGreen.setColor(0x2200ff00);
           }
         @Override
         public void onDraw(Canvas canvas)
         {
           float left=0,top=20,right=0,bottom=20;
           top = Math.max(y-10-110, 0);
      left = Math.max(x-10, 0);
      bottom = Math.min(y+10-110, metrics.heightPixels);
      right = Math.min(x+10, metrics.widthPixels);
      if (activeArnoldware)
                   { canvas.drawCircle(x, y-110, 120, paintRed);
```

```
                canvas.drawRect(left,top,right,bottom, paintGreen);
            }
            else
            {   canvas.drawCircle(x, y-110, 120, paintGreen);
                canvas.drawRect(left,top,right,bottom, paintRed);
            }
            canvas.drawText(touchStr, 0, 20, paintText);

}
    }

@Override
protected void onCreate(Bundle savedInstanceState) {
    super.onCreate(savedInstanceState);

myview = new MyView(this);
    setContentView(myview);
    getWindowManager().getDefaultDisplay().getMetrics(metrics);
    updateAverage();
  }

@Override
public boolean onCreateOptionsMenu(Menu menu) {
    getMenuInflater().inflate(R.menu.main, menu);
    return true;
} public String actionKind(int x)
{
    if   (x==MotionEvent.ACTION_DOWN)
                return "dwn ";
            else if (x==MotionEvent.ACTION_UP)
                    return "UP.. ";
            else if (x==MotionEvent.ACTION_MOVE)
                    return "mov ";
            else if (x==MotionEvent.ACTION_POINTER_DOWN)
            return "pDw ";
            else if (x==MotionEvent.ACTION_POINTER_UP)
                    return "pUp ";
            else
                    return "oth ";
} public void updateAverage()
{
    int i;
    long hdSum=0, huSum=0, hdSumSq=0, huSumSq=0;
    for (i=1; i<=numSample-1; i++)
    {
```

```
            id = (id+numSample-1)%numSample;
            hdSum = hdSum + hd[id];
            hdSumSq = hdSumSq + hd[id]*hd[id];

iu = (iu+numSample-1)%numSample;
            huSum = huSum + hu[iu];
            huSumSq = huSumSq + hu[iu]*hu[iu];
    }
        id = (id+numSample-1)%numSample;
        iu = (iu+numSample-1)%numSample;
        float huAvg = (huSum/((float)numSample-1));
        float huVar = huSumSq/((float)numSample-1) - huAvg*huAvg;
        float hdAvg = (hdSum/((float)numSample-1));
        float hdVar = hdSumSq/((float)numSample-1) - hdAvg*hdAvg;

activeArnoldware = (huAvg < 70.0)&&(hdAvg < 70.0)&&
                (Math.sqrt(huVar) < 7.0)&&
                (Math.sqrt(hdVar) < 7.0);
}

@Override
public boolean onTouchEvent(MotionEvent ev)
{
        String holdTime = "";
        long currenttime, deltatime;
        oldActiveArnoldware = activeArnoldware;
        oldx=x;
        oldy=y;

x = ev.getRawX();
    y = ev.getRawY();

if (downtime>uptime)
          holdTime = " hd="+(ev.getEventTime()-downtime)+" ";
        else
          holdTime = " hu="+(ev.getEventTime()-uptime)+" ";
        String localTouchStr=
          actionKind(ev.getActionMasked())+"("+
    ((int)x)+","+
    ((int)y)+") "+
    ((1000000+ev.getEventTime()-oldtime)+" ").substring(1)+
        holdTime+" h"+
        ev.getHistorySize();

if (localTouchStr.substring(0, 3).equals("dwn"))
        touchStr = localTouchStr;
    else if (localTouchStr.substring(0, 3).equals("UP."))
        touchStr += " "+localTouchStr;
    else
        { if ((oldx==x)&&(oldy==y))
                touchStr += "m";
```

```
        else
                touchStr += "M";
    } currenttime = ev.getEventTime();
    deltatime = currenttime - oldtime;
oldtime = currenttime;

if (ev.getActionMasked() ==
            MotionEvent.ACTION_UP)
  { uptime = oldtime;
    hd[id] = uptime-downtime;

othertime = 0;
    id = (id+1)%numSample;
    updateAverage();
  }
else if (ev.getActionMasked() ==
            MotionEvent.ACTION_DOWN)
  { downtime = oldtime;
    hu[iu] = downtime-uptime;
    iu = (iu+1)%numSample;
    updateAverage();
  }
else
    othertime += deltatime;

if ((!oldActiveArnoldware)&&activeArnoldware)
    Toast.makeText(MainActivity.this,
    (CharSequence)("Invoke ("+((int)x)+","+((int)y)+")"),
                Toast.LENGTH_SHORT).show();
  myview.invalidate();
  return false;
 }
}
```

Appendix 2: Example Control 350 with TI 340 Microcontroller and Latching Relay

```
//copyright 2014 Arnoldware Applications, LLC All Rights Reserved
int set = RED_LED;    //pins on TI340; change for Arduino Uno, etc.
int reset = GREEN_LED;
int switchpin = PUSH2;
int i;

void setup() {
 pinMode(set, OUTPUT);
 pinMode(reset, OUTPUT);
 pinMode(switchpin, INPUT_PULLUP);
}

// pullup means the pushbutton's
// logic is inverted. It is HIGH when open,
// and LOW when pressed.
// the loop routine runs over and over forever void loop() {
  while (digitalRead(switchpin) == HIGH) {
    digitalWrite(set, HIGH);   // turn on for short pulse
    delay(3);              //   used by latching relay
    digitalWrite(set, LOW);    // turn off
    delay(97);             // wait for a 100ms
    digitalWrite(reset, HIGH); // turn on for short pulse
    delay(3);              //   used by latching relay
    digitalWrite(reset, LOW);  // turn off
    delay(97);             // wait for 100ms
  }
  for (i=1; i<=10;i++) {       // 1sec before poll button again
    digitalWrite(set, HIGH);   // turn on for short pulse
    delay(3);              //   used by latching relay
    digitalWrite(set, LOW);    // turn off
    delay(47);             // wait for a 50ms
    digitalWrite(reset, HIGH); // turn on for short pulse
    delay(3);              //   used by latching relay
    digitalWrite(reset, LOW);  // turn off
    delay(47);             // wait for 50ms
  }
}
```

I claim:

1. In a touchscreen device consisting of a translucent touchscreen, a pixel display, and a CPU running an operating-system kernel, gesture-recognition software and at least one application, an accessory for adapting said touchscreen device to the needs of a motion-disabled user comprising:
   a case fabricated from an insulating material;
   a conductive tip attached at the end of said case;
   a conductive surface, capable of making electrical contact with the hand of said motion-disabled user on said case, said conductive surface sufficiently separated from said conductive tip such that the coupling of said conductive surface and said conductive tip by themselves is minimal;
   a switch means, having minimal parasitic capacitance, located inside said case, electrically connected to said conductive tip and to said conductive surface, operative for selectively connecting and disconnecting said conductive surface and said conductive tip based on a control signal;
   a transducer means attached to said case so as to be accessible to said motion-disable user for communicating an intention of said motion-disabled user to select a feature displayed by said application on said pixel display;
   a controller means, connected to said transducer means and to said switch means, operative for generating distinct timing patterns of connection and disconnection between said conductive tip and said conductive surface, based on part on how said motion-disabled user has activated said transducer means; and
   an extra-software-layer means, additionally running in said CPU, operative for receiving touch-event messages from said kernel and for recognizing said distinct timing patterns in said touch-event messages representative of said intention of said motion-disabled user, thereby discarding said touch-event messages and substituting one or more alternative message(s) that causes said gesture-recognition software and said application to carry out said motion-disabled user's intention;
   wherein said distinct timing patterns are generated by said controller means in response to said transducer means via said switch means and are transmitted to said extra-software-layer means via said conductive tip in contact with said translucent touchscreen and via said translucent touchscreen interfacing to said kernel;
   wherein said touchscreen device is shared by a plurality of users including said motion-disabled user, each of said users employing a distinct instance of said accessory, and said controller means of said accessory employed by said motion-disabled user generates a timing pattern uniquely for said motion-disabled user in contrast to those patterns generated by similar instances of said accessory employed by others of said plurality of users, thereby causing said extra-software-layer means to recognize said motion-disabled user and in turn causing said extra-software-layer means to customize its behavior uniquely for said motion-disabled user in contrast to customization for the remainder of said plurality of users.

2. A method for communication between a user and a touchscreen device via an accessory, whereby said touchscreen device includes a translucent touchscreen, a pixel display and a CPU running at least an operating-system kernel and an extra-software layer means, and whereby said accessory includes a conductive tip, a conductive surface in contact with said user, a switch between said conductive tip and said conductive surface, a transducer and a controller connected to said transducer and said switch, said method comprising the steps of:
   placing said conductive tip of said accessory in contact with said translucent touchscreen at (x,y) coordinate(s);
   choosing one of a plurality of modes as the current mode of said controller by manipulation of said transducer by said user;
   generating one of a plurality of distinct-timing patterns as a current-timing pattern by said controller based on said current mode and based on whether said user is activating said transducer;
   switching the connection between said conductive surface and said conductive tip in accordance with said current-timing pattern;
   recognizing a reconstructed-timing pattern by said extra-software layer in motion-event messages received from said kernel via said translucent touchscreen, via said conductive tip and via said switch, based on which of said plurality of distinct-timing patterns most closely matches said motion-event messages, whereby said extra-software layer concurrently receives in said motion-event messages accurate information about said (x,y) coordinate(s), said recognizing step further comprising the steps of:
      storing timestamps temporarily in the memory of said CPU for said motion-event messages received from said kernel;
      subtracting the time of each UP event from the time of its immediately consecutive DOWN event using said timestamps stored in said memory to yield a sequence of up times;
      subtracting the time of each DOWN event from the time of its immediately consecutive UP event using said timestamps stored in said memory to yield a sequence of down times;
      computing values from said sequence of up times and from said sequence of down times; and
      using said values to determine which of said plurality of distinct-timing patterns most closely matches said motion-event message, thereby yielding said reconstructed timing pattern; and
   selecting one of a plurality of distinct actions as a current action in said extra-software layer based on said reconstructed-timing pattern and said (x,y) coordinate(s).

3. The method of claim 2 in which said step of computing values further includes the step of computing the mean of said up times, the standard deviation of said up times, the mean of said down times and the standard deviation of said down times.

4. The method of claim 3 in which said steps of generating and switching further includes:
   choosing a down period based on said current mode and based on whether said user is activating said transducer;
   choosing an up period based on said current mode and based on whether said user is activating said transducer; and
   closing said switch for said down period followed by opening said switch for said up period to produce said current-timing pattern until there is a change in said transducer and said current mode;
   wherein the combination of said down period and said up period is unique among said plurality of distinct-timing patterns.

* * * * *